United States Patent Office 3,364,575
Patented Jan. 23, 1968

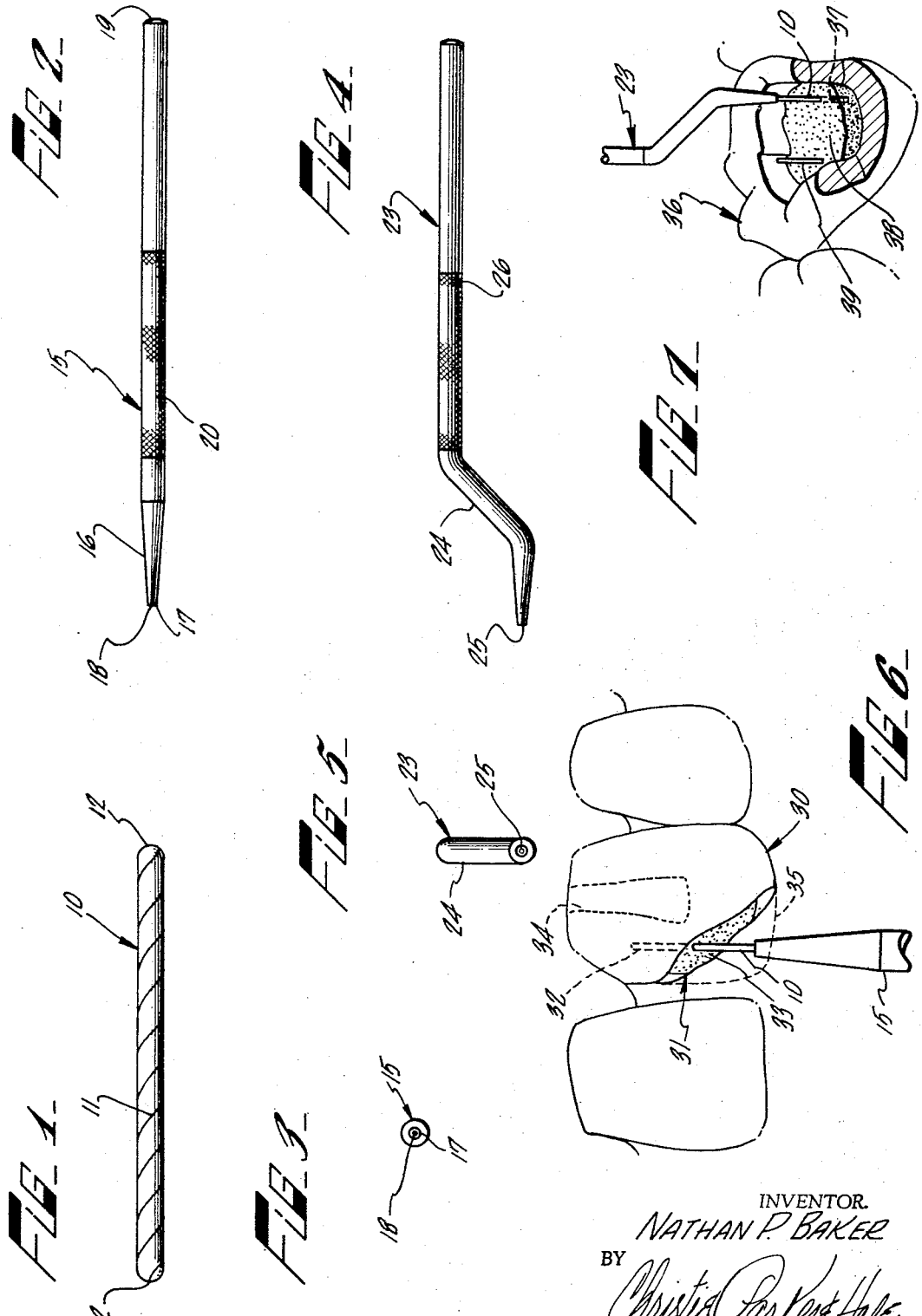

3,364,575
METHOD OF SECURING A RETENTION PIN TO A TOOTH
Nathan P. Baker, Charleston, W. Va., assignor to The West Virginia F.M. Co., Charleston, W. Va., a corporation of West Virginia
Filed July 12, 1965, Ser. No. 471,022
4 Claims. (Cl. 32—15)

This invention relates to a dental retention pin, and to a method and apparatus for installing the pin in a tooth.

Retention pins are widely used in the field of dentistry to anchor a restoration material such as an amalgam, plastic, or synthetic porcelain to a tooth which is being restored. Retention pins are also used in the field of orthodontics as anchor points for various mechanical appliances.

Restoration techniques incorporating retention pins are used to repair fractured or broken teeth, and to fill large caries or cavities. The tooth is prepared for restoration by the conventional steps of cleaning and shaping the fracture or cavity. A retention pin is then secured to the tooth to extend into the region which is to be filled with a restoration material. The restoration material is then packed into the fracture or cavity, the retention pin serving as an anchor and providing added strength to the restored tooth.

In the past, retention pins have been secured to the injured tooth by cementing techniques. A hole of a diameter considerably larger than the diameter of the retention pin is drilled in the tooth. The hole is then filled with a cement, and the retention pin is inserted in the hole. To insure that the pin does not tilt or shift in the hole, the pin is manually held stationary by the dentist until the cement begins to set.

The use of cement to secure a retention pin has several disadvantages. A relatively large hole, say 0.028 to 0.035 inch in diameter, is required to permit the cement to be packed in place and to eliminate air bubbles. The drilling of such a relatively large hole must be done with great care to avoid exposing the pulp canal of the tooth. This problem is particularly acute with children as the pulp canal occupies a relatively large part of an immature tooth.

Dental cements used to secure retention pins are typically quite thick or viscous, and it is difficult to fill a hole with cement and insure that all entrapped air has been removed. Great care must be exercised to avoid mixing of saliva with the cement, as any such mixing may result in an inferior bond. Furthermore, the cement tends to obscure the hole, making it difficult for the dentist to insert the retention pin. The cementing technique also requires extended chair time for dentist and patient as placing the cement in the hole is a painstaking operation, and the pin must be manually held in place by the dentist for a relatively long time until the cement begins to set.

The retention pin of this invention is secured to a tooth without the use of cement. The retention pin is securely locked in place by friction when the pin is gently driven into a slightly undersized hole in the dentin zone of the tooth. I have found that the tooth dentin is sufficiently resilient to expand around the pin as the pin is driven in place. The resilient dentin exerts a contraction force on the installed pin, gripping and clamping the pin in place.

My installation technique permits drilling of a substantially smaller hole than is required when cement is used. All of the problems arising from the use of cement are eliminated, and a quick, easy installation of the pin is made possible. Retention force exerted on the pin by the tooth dentin is very high, and the dentist may proceed with the tooth-restoration process immediately after tapping the pin into the undersized hole without the delay of a cement-setting period. Delays due to mixing and placing cement, and removal of excess cement, are also eliminated.

In terms of a method for securing a retention pin to a tooth, the invention includes the steps of drilling a hole in a dentin zone of the tooth, and driving the retention pin into the hole by application on the pin of an essentially torque-free force directed substantially along the length of the pin. The hole diameter is slightly smaller than the pin diameter, the diameter difference preferably being about 0.001 inch.

In terms of apparatus, the invention includes a retention pin having a diameter approximately 0.001 inch larger than the diameter of a hole drilled in the dentin zone of a tooth which is to be restored. In a preferred form, the pin includes a spiral groove or scratch in its surface to provide improved adherence of a subsequently applied restoration material to the pin.

The invention includes a pin-driving tool for installing the retention pin in a tooth. The tool comprises an elongated rod having a hole in one end to receive and orient an end of the pin. The hole is therefore slightly larger in diameter than the diameter of the pin. Preferably, the portion of the tool adjacent the hole is magnetized whereby the pin is magnetically attracted to and retained in the tool. In an alternative form, the tool may be provided with an offset along its length to permit improved access to posterior teeth.

The invention will be described with reference to the attached drawings in which:

FIG. 1 is a side view of a retention pin;
FIG. 2 is a side view of a pin-driving tool;
FIG. 3 is an end view of the tool shown in FIG. 2;
FIG. 4 is a side view of offset pin-driving tool for use with posterior teeth;
FIG. 5 is an end view of the tool shown in FIG. 4;
FIG. 6 is a perspective view of a retention pin being installed in an anterior tooth; and
FIG. 7 is a perspective view of a retention pin being installed in a posterior tooth.

Referring to FIG. 1, a retention pin 10 is formed from a straight length of round wire which is preferably a corrosion-resistant material such as type 304 stainless steel. I have found that a wire diameter of 0.022 inch is satisfactory for most restoration work. The pin is cut to a convenient length, approximately three-eighths of an inch usually being satisfactory.

In a preferred form of the invention, a shallow spiral groove or scratch 11 is made in the surface of the pin. The scratch may be made by any conventional means, and is conveniently done during straightening if a wire straightener is used to form a length of wire prior to cutting into individual pins. The spiral groove or scratch improves the adherence of a restoration material which is to be applied to the tooth around the pin, and also provides a venting path for air to escape from the hole as the pin is driven in place.

Preferably, each end 12 of the pin is rounded to eliminate burrs and to simplify insertion of the pin in a hole drilled in the tooth. The radius of the rounded end is not critical, and the rounding or smoothing of the pin ends is conveniently accomplished by tumbling.

A pin-driving tool 15, especially suitable for installing retention pins in anterior teeth, is shown in FIGS. 2 and 3. One end 16 of the tool is tapered and terminates in a flat face 17. A hole 18 having a diameter slightly greater than the diameter of the pin 10, is drilled about one-sixteenth of an inch deep in the center of face 17 along the longitudinal axis of the tool.

An end 19 of the tool opposite the flat face is slightly rounded to provide a surface which may be gently tapped to drive the retention pin into the tooth. A center portion 20 of the tool is knurled to provide a good gripping surface.

In a preferred form, end 16 of the tool is magnetized to facilitate holding a retention pin in the tool as the pin is being installed in a tooth. The tool may be formed from a carbon-steel rod, and is convenient to use when about five inches long.

FIGS. 4 and 5 show an alternative form of a pin-driving tool 23 which is especially useful to install retention pins in posterior teeth. This tool is similar to tool 15 just described, but includes an offset section 24 which displaces the longitudinal axis of a pin-holding hole 25 from the longitudinal axis of a hand-grip portion 26. The offset provides convenient access to the posterior teeth in the rear of the patient's mouth.

The method of installing the retention pin in a tooth is shown in FIG. 6. An anterior tooth 30 has a fractured or injured portion 31 which has been prepared for restoration. A hole 32 is drilled into a dentin zone 33 of the tooth. This hole should be drilled with a self-centering spiral drill mounted in a low-speed handpiece, and is usually oriented parallel to a pulp canal 34 of the tooth. If the tooth enamel must be penetrated, an initial opening in the enamel can be made using a conventional drill and high-speed handpiece.

The hole in the dentin is slightly smaller than the diameter of the retention pin which is to be installed in the tooth. I have found that the retention pin will be securely locked in place if the hole has a diameter about 0.001 inch smaller than the diameter of the retention pin. If a 0.022-inch diameter retention pin is used, hole 32 would thus have a diameter of 0.021 inch. The 0.001 inch diameter difference is preferably held to a tolerance of about plus or minus 0.00035 inch. The hole is drilled to a depth of about one-eighth of an inch, and is dried before installation of the pin.

One end of a retention pin 10 is inserted in a pin-driving tool 15, and the other end of the pin is positioned in the mouth of hole 32. The pin is then driven into the hole by gently tapping the rounded end of the pin-driving tool. Seating of the pin in the bottom of the hole is easily detected by the dentist. The pin-driving tool is then slipped off the pin which is now securely anchored in the tooth dentin.

If the portion of the pin extending from the dentin is too long, it may be shortened by using a conventional high-speed burr (not shown). The pin may also be bent after installation if desired, but should not be notched as this might weaken the pin.

Restoration of the tooth is then completed by packing a material 35 (shown in phantom in FIG. 6) such as synthetic porcelain, plastic, or amalgam around the retention pin. The pin anchors the restoration material and adds to the strength of the restored tooth in the same way that reinforcing steel bars are used to strengthen concrete structures.

FIG. 7 illustrates the installation of a retention pin 10 in a damaged posterior tooth 36. The tooth has been prepared for restoration and a hole 37 drilled into a dentin zone 38 as described above. A retention pin is mounted in an offset pin-driving tool 23, and the pin is positioned in the mouth of the hole. The pin is then driven into place by gently tapping the end of the tool. The offset of tool 23 provides convenient access to the posterior teeth. It may be desirable to install two or more pins in large fractures or cavities, and a second pin 39 is shown installed in another part of the dentin zone.

The retention-pin installation method of this invention provides a very secure mounting of the pin in the tooth. This secure mounting is due to the resilient nature of the dentin which allows the pin to be gently forced in place in an undersized hole. Once the pin is installed, the resilient dentin exerts a high pressure on the pin, gripping and securing it tightly in place.

The method of this invention is especially advantageous as it permits the use of a retention pin of small diameter. This insures that only a small hole need be drilled in the injured tooth, as is especially important in immature teeth of children where the pulp canal occupies a relatively large part of the tooth. The method is also advantageous in that a simple straight-sided round hole is adequate to secure the pin, there being no need for undercutting or other special shaping of the hole. Because of the resilient nature of the dentin and the small pin diameter, there is little danger of splitting or breaking a tooth during pin installation.

Although the invention has been described in terms of its use in restoration of a fractured or decayed tooth, it is to be understood that it may be used in other applications requiring an anchored pin in a tooth. For example, certain dental procedures, such as the treatment of an impacted "high" cuspid, require an anchor point on the affected tooth. The retention pin of this invention may be secured in such a tooth in the manner described above, and the projecting portion of the pin bent into a loop or hook to which various appliances may be secured. The pin is also useful in many other dental processes such as crown and bridge work.

I claim:

1. A method of securing an elongated retention pin of a given diameter to a tooth, comprising the steps of:

drilling a hole in a dentin zone of the tooth, the hole diameter being silghtly smaller than the given diameter, and driving the pin into the hole by application on the pin of an essentially torque-free force directed substantially along the length of the pin.

2. A method of securing an elongated retention pin of a given diameter to a tooth, comprising the steps of:

drilling a hole in a dentin zone of the tooth, the hole diameter being approximately 0.001 inch smaller than the given diameter, and driving the pin into the hole by application on the pin of an essentially torque-free force directed substantially along the length of the pin.

3. A method of restoring a partially cut-away tooth having an exposed dentin zone, comprising the steps of:

drilling a hole having a circular cross section in the dentin zone of the tooth;

driving an elongated retention pin having a circular cross section into the hole by application on the pin of an essentially torque-free force directed substantially along the length of the pin, the pin having a diameter about 0.001 inch larger than the hole diameter, and applying a restoration material to the tooth around the retention pin.

4. The method defined in claim 3 in which the hole in the dentin zone has a diameter of approximately 0.021 inch.

References Cited

UNITED STATES PATENTS

| | | | |
|---|---|---|---|
| 143,418 | 10/1873 | Osmond | 32—15 |
| 1,105,105 | 7/1914 | Sherman | 128—290 |
| 2,362,741 | 11/1944 | Berke | 128—89.1 |
| 2,413,333 | 12/1946 | Myerson | 32—10 |
| 2,572,714 | 10/1951 | Funderburg | 32—6 |
| 2,690,617 | 10/1954 | Giern et al. | 32—40 |
| 2,187,852 | 1/1940 | Friddle | 128—92 |

FOREIGN PATENTS 142,536    1919    Great Britain.

LOUIS G. MANCENE, *Primary Examiner.*

RICHARD A. GAUDET, *Examiner.*

R. E. MORGAN, *Assistant Examiner.*